(12) United States Patent
Tehrani et al.

(10) Patent No.: US 8,468,479 B2
(45) Date of Patent: Jun. 18, 2013

(54) CONSISTENT HIERARCHICAL TIMING MODEL WITH CROSSTALK CONSIDERATION

(75) Inventors: Peivand Tehrani, Campbell, CA (US); Li Ding, San Jose, CA (US); Narender Hanchate, San Jose, CA (US); Rupesh Nayak, San Ramon, CA (US); Yazdan Aghaghiri, Los Altos, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/052,016

(22) Filed: Mar. 18, 2011

(65) Prior Publication Data

US 2012/0239371 A1 Sep. 20, 2012

(51) Int. Cl.
*G06F 9/455* (2006.01)
*G06F 17/50* (2006.01)

(52) U.S. Cl.
USPC ............................ 716/108; 716/113; 716/115

(58) Field of Classification Search
USPC .......................................... 716/108, 113, 115
See application file for complete search history.

(56) References Cited

U.S. PATENT DOCUMENTS

| | | | |
|---|---|---|---|
| 5,579,510 A | 11/1996 | Wang et al. | |
| 5,650,938 A | 7/1997 | Bootehsaz et al. | |
| 5,778,216 A | 7/1998 | Venkatesh | |
| 5,831,869 A | 11/1998 | Ellis et al. | |
| 6,237,127 B1 | 5/2001 | Craven et al. | |
| 6,405,348 B1 | 6/2002 | Fallah-Tehrani et al. | |
| 6,609,232 B2 | 8/2003 | Hirotsu et al. | |
| 7,100,125 B2 | 8/2006 | Yang et al. | |
| 7,103,863 B2 * | 9/2006 | Riepe et al. | 716/113 |
| 7,249,334 B2 | 7/2007 | Nakashiba | |
| 7,437,695 B1 | 10/2008 | Ranjan et al. | |
| 7,523,428 B2 | 4/2009 | Sripada | |
| 7,861,201 B2 * | 12/2010 | Chang | 716/113 |
| 8,001,502 B2 * | 8/2011 | Chang | 716/104 |
| 2003/0009727 A1 * | 1/2003 | Takeyama et al. | 716/1 |
| 2003/0229869 A1 * | 12/2003 | Yang et al. | 716/5 |
| 2004/0025129 A1 | 2/2004 | Batchelor | |
| 2005/0229128 A1 | 10/2005 | Sripada | |
| 2007/0168897 A1 * | 7/2007 | Sripada | 716/6 |
| 2008/0184186 A1 * | 7/2008 | Belaidi et al. | 716/13 |
| 2010/0180242 A1 * | 7/2010 | Kalafala et al. | 716/6 |
| 2010/0223588 A1 * | 9/2010 | Belaidi et al. | 716/13 |
| 2011/0167396 A1 * | 7/2011 | Riviere-Cazaux | 716/108 |
| 2011/0307850 A1 * | 12/2011 | Dartu et al. | 716/108 |

OTHER PUBLICATIONS

Daga, Ajay J, et al, "Automated Timing Model Generation" DAC'02 Proceedings of the 39th annual Design Automation Conference, Jun. 2002, 6 pages.

(Continued)

*Primary Examiner* — Suresh Memula
(74) *Attorney, Agent, or Firm* — Blakely, Sokoloff, Taylor & Zafman LLP; Judith A. Szepesi

(57) ABSTRACT

A method and apparatus to provide a hierarchical timing model with crosstalk consideration is provided. In one embodiment, the method comprises performing block level analysis of a circuit, in one or a plurality of iterations, and storing per iteration data. The method further comprises, in one embodiment, utilizing the per iteration data in performing top level analysis of the circuit.

21 Claims, 9 Drawing Sheets

OTHER PUBLICATIONS

Ran, Yajun, et al, "Eliminating False Positives in Crosstalk Noise Analysis," IEEE Transactions on Computer-Aided Design of Integrated Circuits and Systems, vol. 24, No. 9, Sep. 2005, pp. 1406-1419.

Sirichotiyakul, Supamas, et al, "Driver Modeling and Alignment for Worse-Case Delay Noise," DAC '01 Proceedings of the 38th annual Design Automation Conference, 2001, 6 pages.

"PrimeTime Scales Timing Analysis Beyond 500 Million Instances," <http://www.synopsys.com/Tools/Implementation/SignOff/PrimeTime/Pages/HyperScale-Tech.aspx>, Accessed Oct. 19, 2012, 1 page.

Walia, Sunil, Reducing Turnaround Time with Hierarchical Timing Analysis, <www.eetimes.com/General/PrintView/4228791>, Dated Oct. 3, 2011, 4 pages.

* cited by examiner

CONSISTENT HIERARCHICAL TIMING MODEL WITH CROSSTALK CONSIDERATION

FIELD OF THE INVENTION

The present invention relates to static timing analysis of integrated circuits, more particularly to timing models for static timing analysis, and even more particularly to hierarchical timing models for static timing analysis.

BACKGROUND

Crosstalk is caused by capacitive coupling from one part of a circuit to another, causing noise or delay error. When evaluating the effect of crosstalk, the circuit which is being evaluated is referred to as the 'victim' while the circuits whose effects on the 'victim' are measured are referred to as 'aggressors'. In the presence of crosstalk, timing is affected by secondary nets (e.g. aggressors) and timing analysis usually takes multiple iterations.

As integrated circuit designs have become larger and larger, certain computer-aided design tools utilize models in order to quickly perform timing analysis of the constituent circuitry comprising a given block. Examples include ILMs (interface logic models) and ETMs (extracted timing models). The use of models functions by reducing the static timing analysis runtimes and the memory it uses to more manageable levels.

However, there are problems regarding the use of models in a hierarchical design flow. One problem involves the fact that the various functional blocks comprising a hierarchical design are allocated timing budgets. The timing budgets are intended to reflect the relative contribution of the timing of a particular block to the overall timing performance of the integrated circuit design. In practice, such budgets are difficult to establish accurately. Another problem involves the fact that it is difficult to manage and merge the timing constraints of lower-level blocks with the constraints of top-level blocks. For example, constraints of coupled blocks are often particularly uncertain until the constraints of lower-level blocks have been firmly established.

The above problems and more, lead to chip designers having a general lack of confidence in the static timing analysis results obtained using hierarchical design flows. One conventional solution is to flatten a hierarchical design such that it is represented as a single monolithic integrated circuit design (e.g., no blocks or modeling) and run conventional static timing analysis on the flattened design. Once again, the problem with this solution is that as designs get larger runtime can extend into several days and require very expensive computer systems with very large memory sizes.

SUMMARY

A method and apparatus to provide a hierarchical timing model with crosstalk consideration is provided. In one embodiment, the method comprises performing block level analysis of a circuit, in one or a plurality of iterations, and storing per iteration data. The method further comprises, in one embodiment, utilizing the per iteration data in performing top level analysis of the circuit.

In one embodiment, the system further comprises categorizing aggressors into one of a plurality of categories, and storing a different level of data for each category of aggressor.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The method and apparatus described is a crosstalk-aware timing model for hierarchical static timing analysis that generates all necessary data to produce consistent quality of results as compared to a flattened analysis. The model in one embodiment includes iteration-specific timing data history and the computational signature of secondary nets, which capture the electrical effects of secondary nets as required for static timing analysis.

In one embodiment, the process first identifies all aggressor nets that have an impact on a particular victim. The process then categorizes the nets which affect a particular victim net as having a small crosstalk effect, a medium crosstalk effect, or a large crosstalk effect on the victim. In one embodiment, for a net with small crosstalk effect only, the final crosstalk effect namely delta delay and delta slew are stored. In a net with a medium crosstalk effect, only the abstracted values (e.g. lumped) data describing victim and aggressor are stored. In one embodiment, the system includes timing data history in the block timing model so that timing consistency is ensured in all iterations. For large crosstalk effect, in one embodiment the full data is stored. In one embodiment, a simplified version of the circuit is stored. In one embodiment, a different number of categories may be used.

Embodiments of the present invention are implemented as part of a solution for hierarchical static timing analysis (STA) that can provide high degrees of accuracy and consistency in its results while executing STA runtimes much shorter than conventional flat STA runtimes and requiring much less memory. The accuracy and consistency of the results of recursive hierarchical STA in accordance with embodiments of the present invention leads to a high degree of confidence in the STA results. The accurate and consistent results are provided without requiring inordinately expensive computer systems with huge memory sizes.

In one embodiment, the method includes accessing a lower-level netlist representing a lower-level block of a circuit design to be realized in physical form, and accessing constraints for the lower-level block. Static timing analysis is performed on the lower-level block. The method includes accessing an upper-level netlist representing an upper-level block of the circuit design to be realized in physical form, and accessing constraints for the upper-level block. Static timing analysis is performed on the upper-level block using results from iterations of the static timing analysis on the lower-level blocks.

Figure 1:
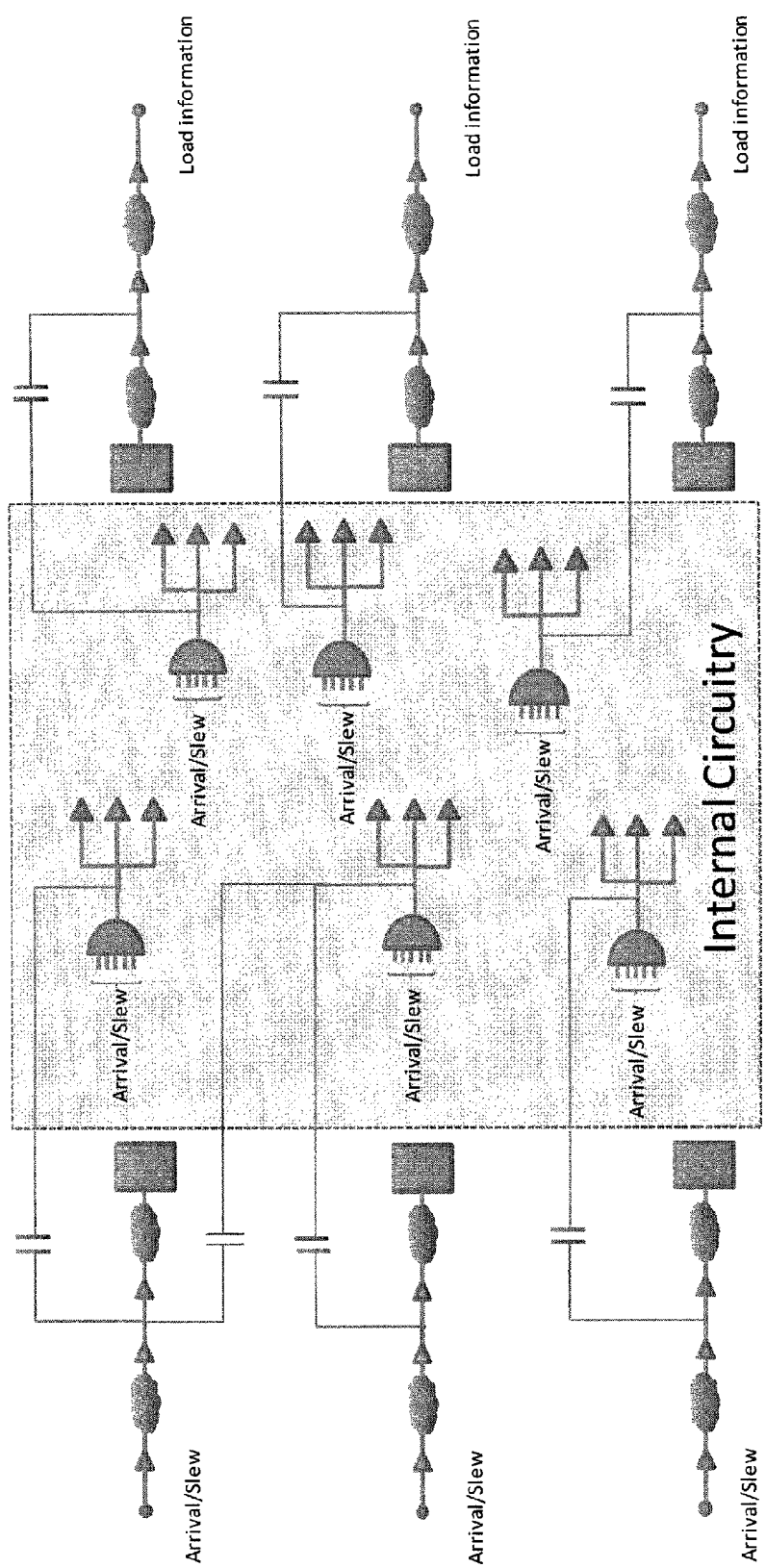
FIG. 1 is a diagram of a circuit on which crosstalk-analysis may be performed.
Figure 2:
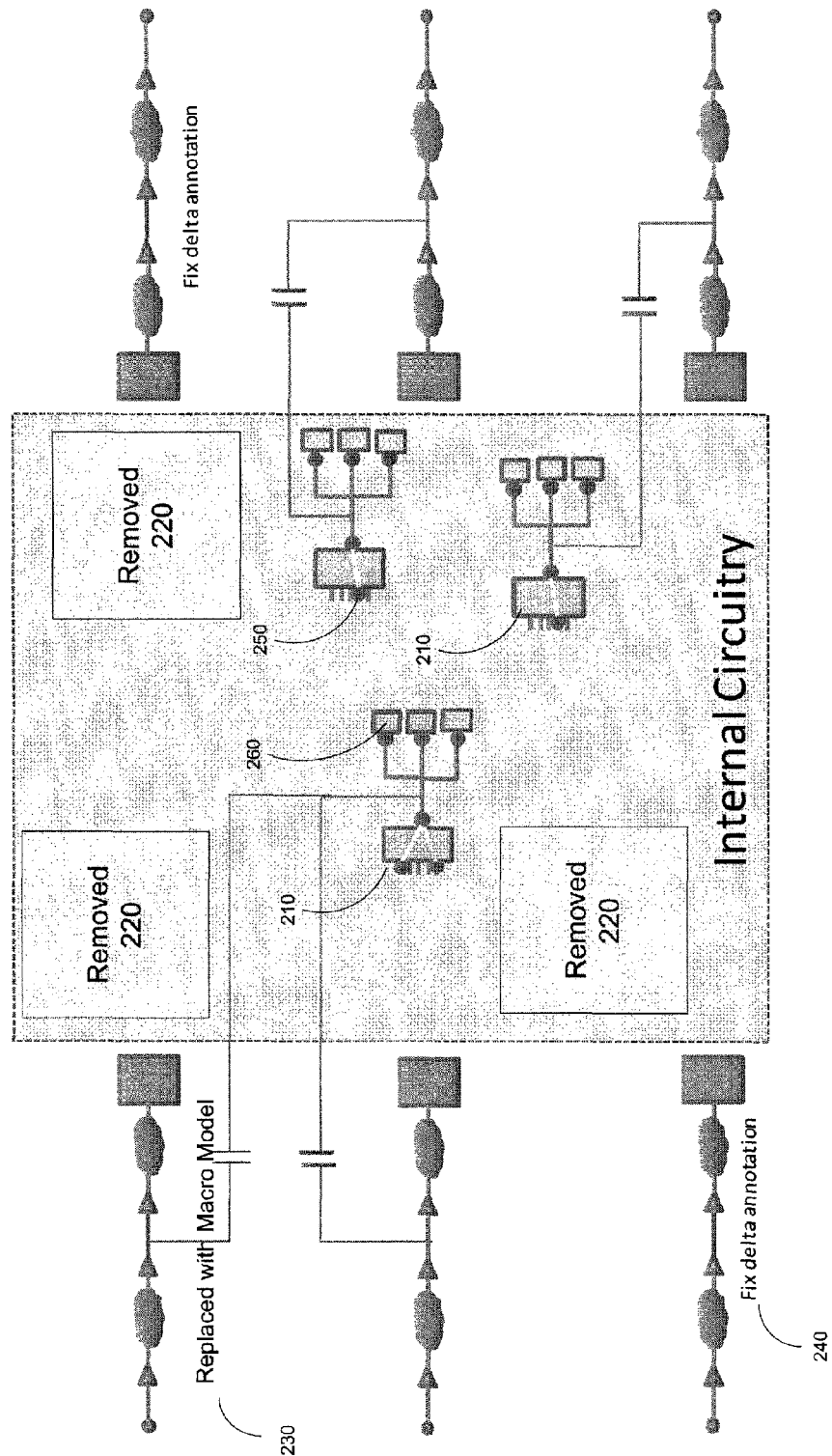
FIG. 2 is a block diagram showing the simplified elements from FIG. 1.

FIGS. 1 and 2 described below illustrate certain aspects of block level modeling as utilized in hierarchical design flows in accordance with embodiments of the present invention. Generally, hierarchical design refers to the division of a circuit netlist into a plurality of hierarchical blocks, where some blocks are more encompassing top-level blocks and other blocks are lower-level foundation blocks.

With hierarchical design flows, a large complex design can be divided into blocks, e.g., user or system defined hierarchies within a chip for analysis. This enables the system to replace lower level blocks with timing models, when evaluating higher level blocks. Such timing models provide a compact way to use the interface timing information from the lower level blocks in calculating higher level results. Some static timing analysis tools, such as the PrimeTime™ SI licensed by Synopsys, Inc., can automatically generate timing models from the gate-level netlist for a design.

The use of block timing models in place of the full gate-level netlist of the block improves performance and capacity of chip-level STA, particularly for large complex designs. In today's designs, when gate counts can exceed 5 million gates, the use of such models is a necessity to enable STA within a reasonable timeframe. Moreover, using the hierarchical flow based timing models can preserve information required to verify block integration in the design, while reducing processing complexity and time.

Automatic model generation can include the use of interface logic models (ILMs) and ETMs (extracted timing models). In a typical usage scenario, ILMs discard the netlist, constraints, and back-annotation associated with internal register-to-register paths on a design, containing only the interface logic of the original netlist thereby offering significant runtime and performance improvements without sacrificing accuracy. For example, logic that is only contained in register-to-register paths within a block is not placed in an ILM.

When routing is performed for circuits in the design, the physical proximity of nets could result in cross-coupling that leads to undesirable effects like crosstalk. Crosstalk is the effect of one net affecting the speed of the signal on the other net, thereby affecting the timing of one or both nets. Crosstalk can also affect two nets in different blocks. The net whose timing is affected by crosstalk is called the victim, and the net that causes this timing change is called the aggressor. The present method replaces the blocks with timing models which provide an approximation of their effect for crosstalk considerations. These timing models can be used in place of the full gate-level netlist for a block. These substitutions are useful for improving performance and capacity associated with chip-level STA.

FIG. 1 shows an exemplary circuit diagram for an exemplary block, and FIG. 2 illustrates the simplified version of the netlist in which certain aggressors have been replaced. FIG. 1's circuit diagram shows an ILM block which is evaluated for crosstalk effects. A variety of aggressors are shown are shown in FIG. 1 in their original non-simplified form.

FIG. 2 shows the simplified circuit, in which the aggressors have been replaced by simplified circuit elements which represent the effects of the aggressors.

In one embodiment, the process starts from an uncoupled ILM where coupling relations are not considered, and boundary logics are marked in a timing update. In one embodiment the process identifies effective aggressors of ILM boundary nets. The arrival and slew of the aggressors is added in ILM setup, in one embodiment. The process then sets up levelized aggressor net marking during timing update at the block in one embodiment. The system in one embodiment stores per-iteration aggressor information. This is represented by aggressor net receiver pin caps, driver model and arrival windows.

The process in one embodiment identifies boundary nets with small crosstalk delta delay, delta slew and total bump, and prunes aggressor information for victim nets with small crosstalk. The delta delay and delta slew is annotated to account for pruned crosstalk, in one embodiment. This is shown in FIG. 2 as the removed elements 220.

Boundary nets with medium crosstalk effect are replaced by a macro-model 230 (and removed element 220). In one embodiment, for large delta values the aggressor information is retained as shown as circuit 210. The aggressor information may include network, driver, load and aggressor cell inputs. In one embodiment, a similar type of analysis and annotation is used for noise analysis.

In the example shown in FIGS. 1 and 2, there are three large aggressors 210, shown with a simplified circuit, while two small aggressors have been entirely replaced by fixed delta annotation 240, and a medium aggressor is shown as replaced by a macro model 230.

For medium aggressors 230 in one embodiment a computational macro-model containing aggressor driver in form of a Thevenin model and aggressor loading in lumped form is stored. In another embodiment, another model is used. If all of the aggressors of victim are small aggressors in one embodiment only final values of crosstalk delay and slew data is stored for the specified victim. It is intended, in one embodiment, that most of the aggressors in a typical circuit be classified as medium aggressors and small aggressors.

In one embodiment, the large aggressors 210 are also simplified in FIG. 2, compared to the original circuitry shown in FIG. 1. The driver side 250 with multiple inputs, arrival, and slew is replaced with a simpler representation. In one embodiment, the inputs may be replaced by information only for those inputs which are relevant to the worst case output scenario. This is indicated by the red dots associated with a subset of inputs. This simplifies the driver side. Similarly, the receiver may be replaced by simplified representation of load 260 (e.g. input pin capacitors). This reduces the gate count.

The process in one embodiment includes a block level analysis in which the per iteration results are stored, and a top level analysis which utilizes the per iteration results stored from the block level analysis. In one embodiment, the results of the top level analysis may be used by a subsequent block level analysis. One embodiment of this process is described in co-pending patent application Ser. No. 12/815,325, filed Jun. 14, 2010, entitled Recursive Hierarchical Static Timing Analysis, assigned to the same entity, which is incorporated herein by reference.

Figure 3:
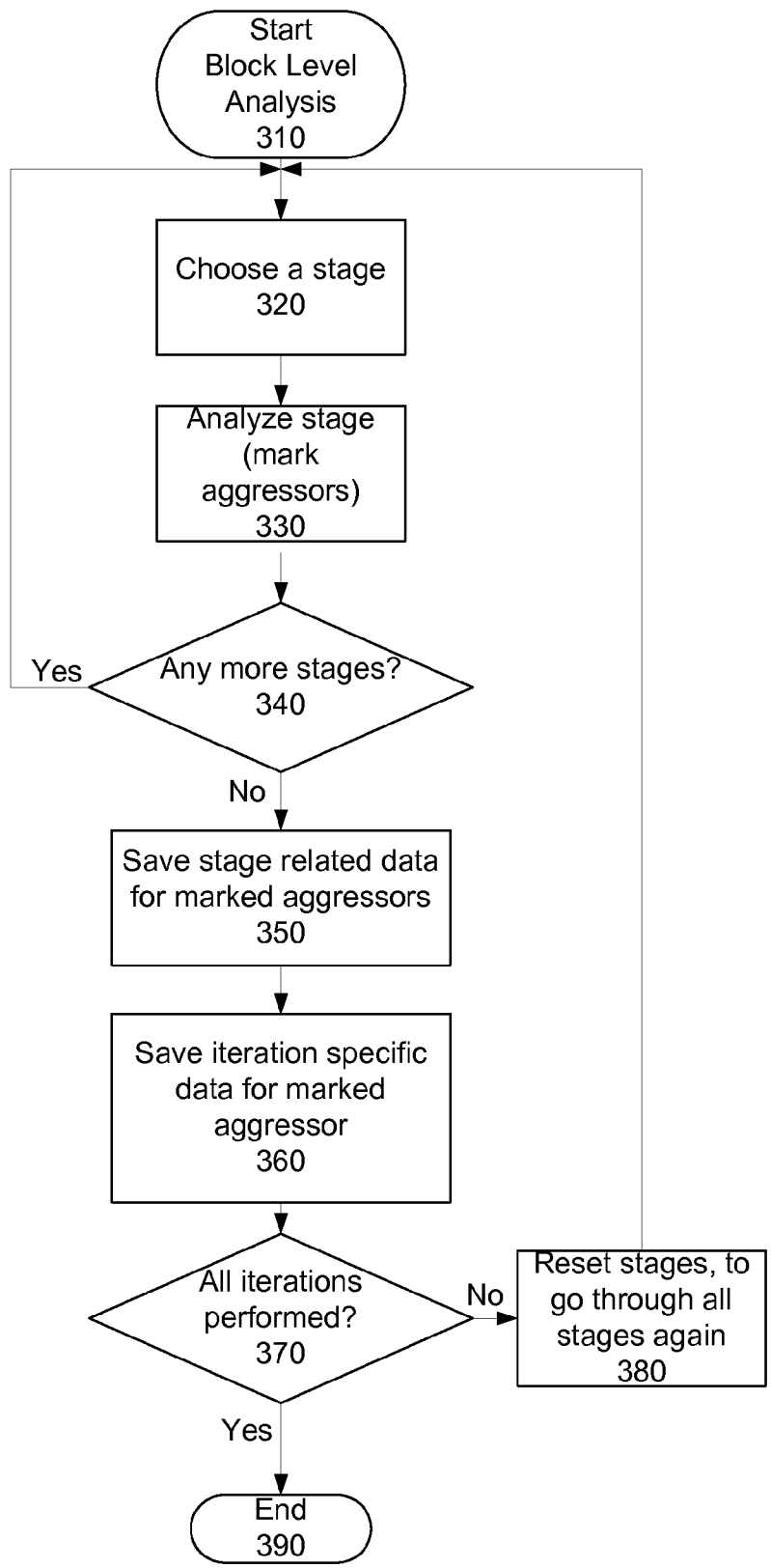
FIG. 3 is an illustration of one embodiment of block level processing.

FIG. 3 is a flowchart of one embodiment of the block level analysis. The block-level analysis is performed on a sub-part of the circuit. The process starts at block 310.

At block 320, a stage is chosen for analysis. At block 330, the analysis is performed on the selected stage. The analysis evaluates the influence of the aggressors. During this stage, each of the aggressors is marked. In one embodiment, the aggressors are marked as small, medium, and large. In another embodiment, the aggressors may be marked in more or fewer categories.

At block 340, the process determines whether there are any more stages to evaluate. If so the process returns to block 320, to choose a next stage for analysis. If no more stages exist, the process continues to block 350.

At block 350, the stage-related data is saved. In one embodiment, the stage related data includes, for example, aggressor-victim pair-wise total coupling capacitance, etc. This is a small data block, especially compared to the full data set representing all of the aggressors in the block.

At block 360, the iteration specific data is saved for the marked aggressors. At the end of each iteration, before iteration-specific data is removed, the lumped aggressor data saved. The lumped aggressor data, in one embodiment, includes Thevenin model parameters, VDD, trip-points, total wire cap, total resistance, total pin capacitance, etc. This is a larger data block, but still a relatively small block compared to the data associated with all the aggressors. In one embodiment, this is stored on disk, e.g. not in local cache.

At block 370, the process determines all iterations have been performed. If so, the process ends at block 390. If not, the process continues to block 380.

At block 380, the stage tracking is reset, so that the next iteration can go through all the stages again. In one embodiment, the local memory is cleaned up. This enables multiple iterations to be run, without requiring a significantly larger amount of cache memory. The process then continues to block 320, to choose a stage for evaluation in this iteration.

Figure 4:
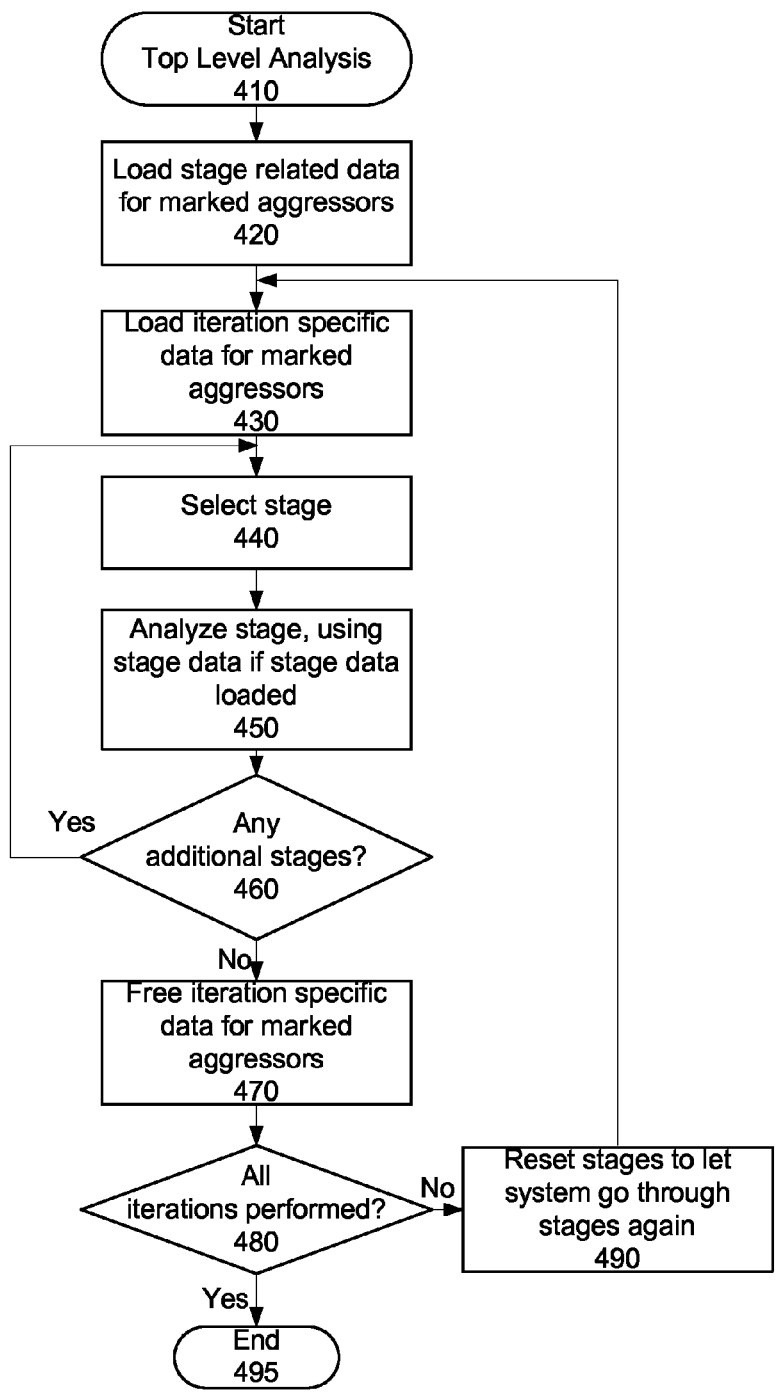
FIG. 4 is a flowchart of one embodiment of top level analysis.

FIG. 4 is a flowchart of one embodiment of performing the top level analysis. The top level analysis uses the data stored from the stage analysis, one embodiment of which was described above with respect to FIG. 3. The process starts at block 410.

At block 420, at the start of the process, the marked aggressor marking data is loaded from the disk.

An iteration is selected, at block 430, and the lumped aggressor data is loaded from the disk, for that particular iteration. In one embodiment, only data from non-major aggressors are loaded. In one embodiment, the data is loaded into local memory for the iteration.

At block 440, a stage is chosen, and the data is set up for the stage analysis. In this step small or medium crosstalk information from the block is set up for analysis At block 450, the top level analysis is performed for the stage. If stage data from the block was loaded, it is used during this process.

After the analysis stage is complete, the process determines whether there are additional stages in this iteration, at block 460. If so, the process returns to block 440, to choose a new stage and set up data for the new stage.

If all stages are complete, at block 470, the memory storing the data from the prior iteration is freed. The process also determines whether more iterations should be performed at block 480. If the process determines that more iterations should be performed, the process continues to block 490, where stage tracking is reset for the next iteration. The process then returns to block 430, to load aggressor data. If no further iterations are to be performed, the process ends at block 495.

Figures 5A, 5B:
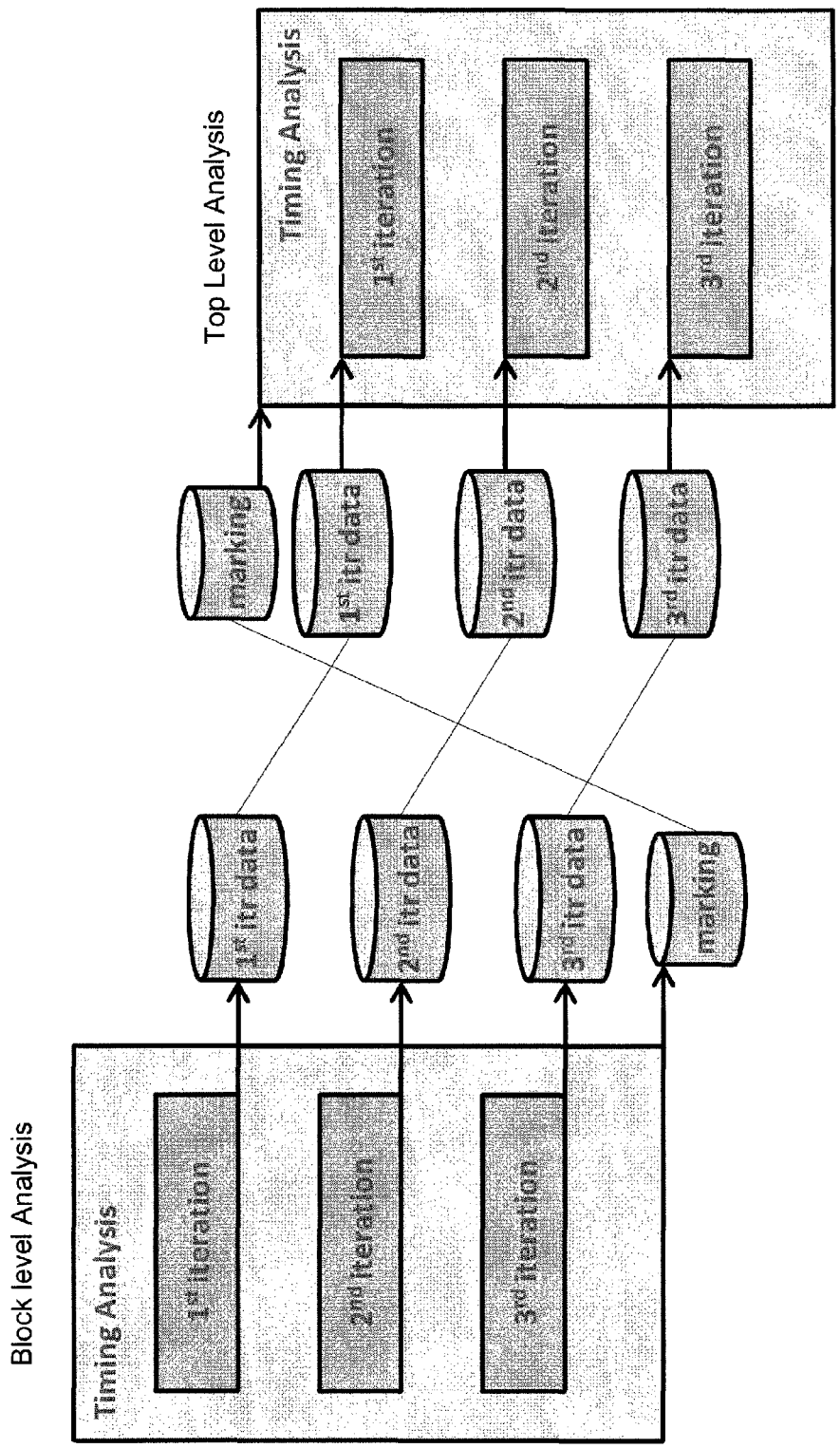
FIG. 5A is one embodiment of storing iteration data.
FIG. 5B is one embodiment of using iteration data.

FIG. 5A shows the processing of iterations, and storing of data for each iteration during the block level analysis. This corresponds to one embodiment of the data flow during the process shown in FIG. 3. FIG. 5B shows the processing of iterations and the loading of data for each iteration during the top level analysis. This corresponds to one embodiment of the data flow during the process shown in FIG. 4. The dashed lines show that the data stored during the block level analysis is the same data which is loaded during the top level analysis.

Figure 6:
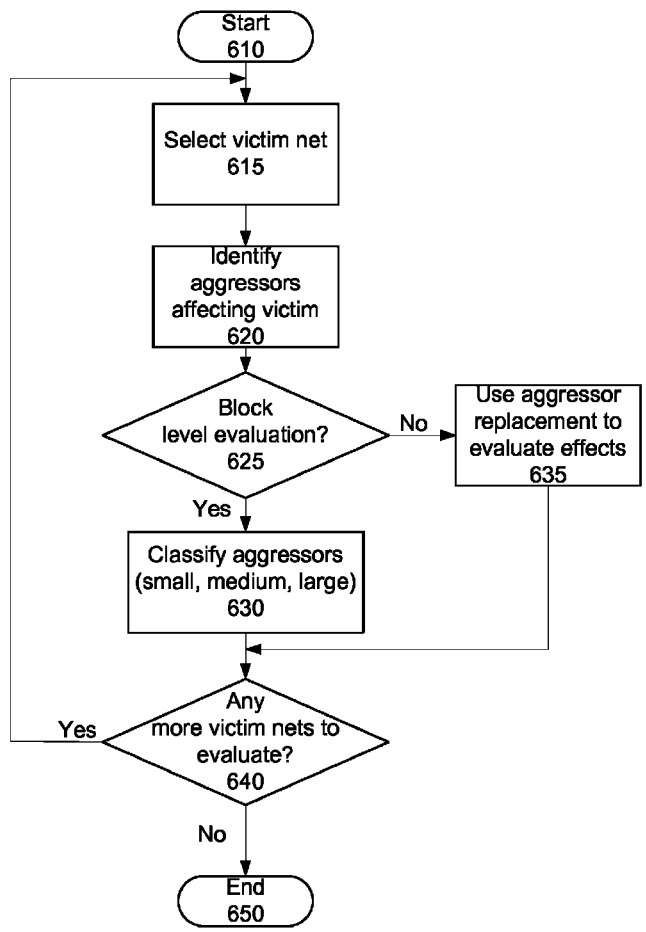
FIG. 6 is a flowchart of one embodiment of classifying aggressors.

FIG. 6 is a flowchart of one embodiment of the stage-level analysis. This corresponds in one embodiment to the analyze stage (mark aggressors) block 330 of FIG. 3, and the analyze stage block 450 of FIG. 4.

The process starts at block 610. At block 615, a victim net is selected. At block 620, the aggressors which affect the victim net are identified.

At block 625, the process determines whether the current analysis is at the block level or at the top level. If the analysis is at the block level, the process continues to block 630. At block 630, the aggressors are classified. In one embodiment, the classification may be into three categories. In another embodiment, fewer or more categories may be used. In one embodiment, the three categories are small effect, medium effect, and large effect. This data is stored, as shown in block 350 of FIG. 3. The process then continues to block 640.

If at block 625 the process determined that the evaluation is at the top level, e.g. not at the block level, the process continues to block 635. At block 635, the replaced aggressor values are used to evaluate the aggressor's effects on the victim net. This data is already loaded, as shown in block 420 of FIG. 4. The process then continues to block 640.

At block 640, the process determines whether there are any further victim nets to evaluate. If so, the process returns to block 615 to select the next victim net. If there are no further victim nets to analyze, the process ends at block 650. In this way, the analysis steps through each victim net and each aggressor and uses the information derived from the block level analysis' simplification to do the top level analysis.

Figure 7:
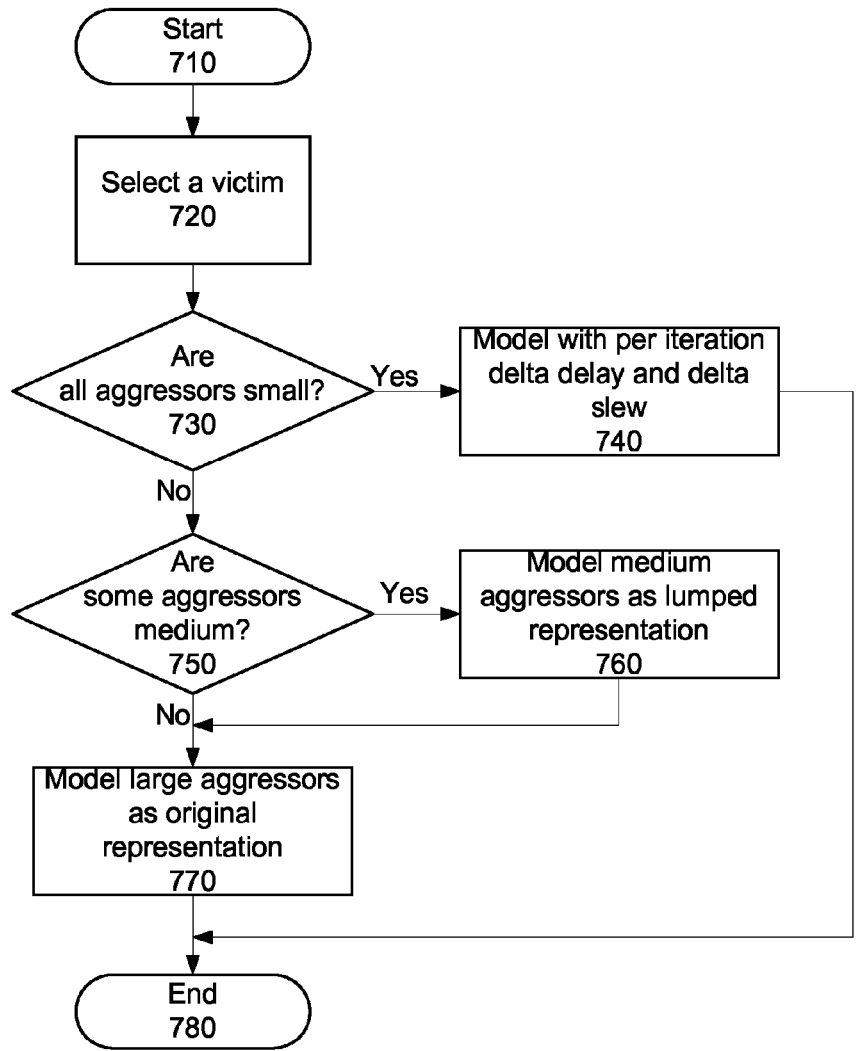
FIG. 7 is a flowchart of another embodiment of classifying victim nets.

FIG. 7 is a flowchart of one embodiment of characterizing aggressors. This corresponds to block 630 of FIG. 6, in one embodiment. The process starts at block 710.

At block 720, a victim is selected.

At block 730, the process determines whether all aggressors which have an impact on that victim are small. This is based on the classification of aggressors, as described above. If so, the process continues to block 740, and the aggressors are modeled with per-iteration delta-delay and delta slew information. This corresponds to the removed circuits in FIG. 2, showing the fixed delta annotation associated with the aggressors.

If not all aggressors are found to be small, at block 730, the process continues to block 750. At block 750, the processor determines whether some of the aggressors are medium. If so, the medium aggressors are modeled as a lumped macro-model representation at block 760. The lumped representation is a computation macro-model. The process then continues to block 770. At block 770, the remaining aggressors, which are large aggressors, are modeled as original representations. In one embodiment, large aggressors are also simplified as depicted in FIG. 2. The process then ends at block 780.

In one embodiment, if a particular aggressor is classified at different levels with respect to different victims—e.g. it has a small effect on victim one, but a strong effect on victim two—the highest level classification is selected. Thus, in this example, the strong level aggressor data, e.g. a full representation would be stored, rather than simply storing the delay and slew caused by this particular aggressor.

The vast majority of aggressors are likely to be classified as having a medium effect. In one embodiment, there are three levels of data saved for the aggressors, depending on their classification. For example, victims with small effective aggressors may be reflected only as small delta data while mid-level aggressors are saved as lumped computational macro-models. Large effective aggressors, in one embodiment limited to a small percentage of aggressors by design, are saved as more detailed representations. In one embodiment, the division between the small, medium, and large level aggressors is defined to encompass a particular percentage of aggressors in each category. In another embodiment, the aggressor level is determined based on the actual contribution to the victim net. In one embodiment, for example, the aggressor nets are classified as small if they contribute less than 5 ps of delta delay, large if the bump is larger than 20% of VDD, and medium otherwise.

Figure 8:
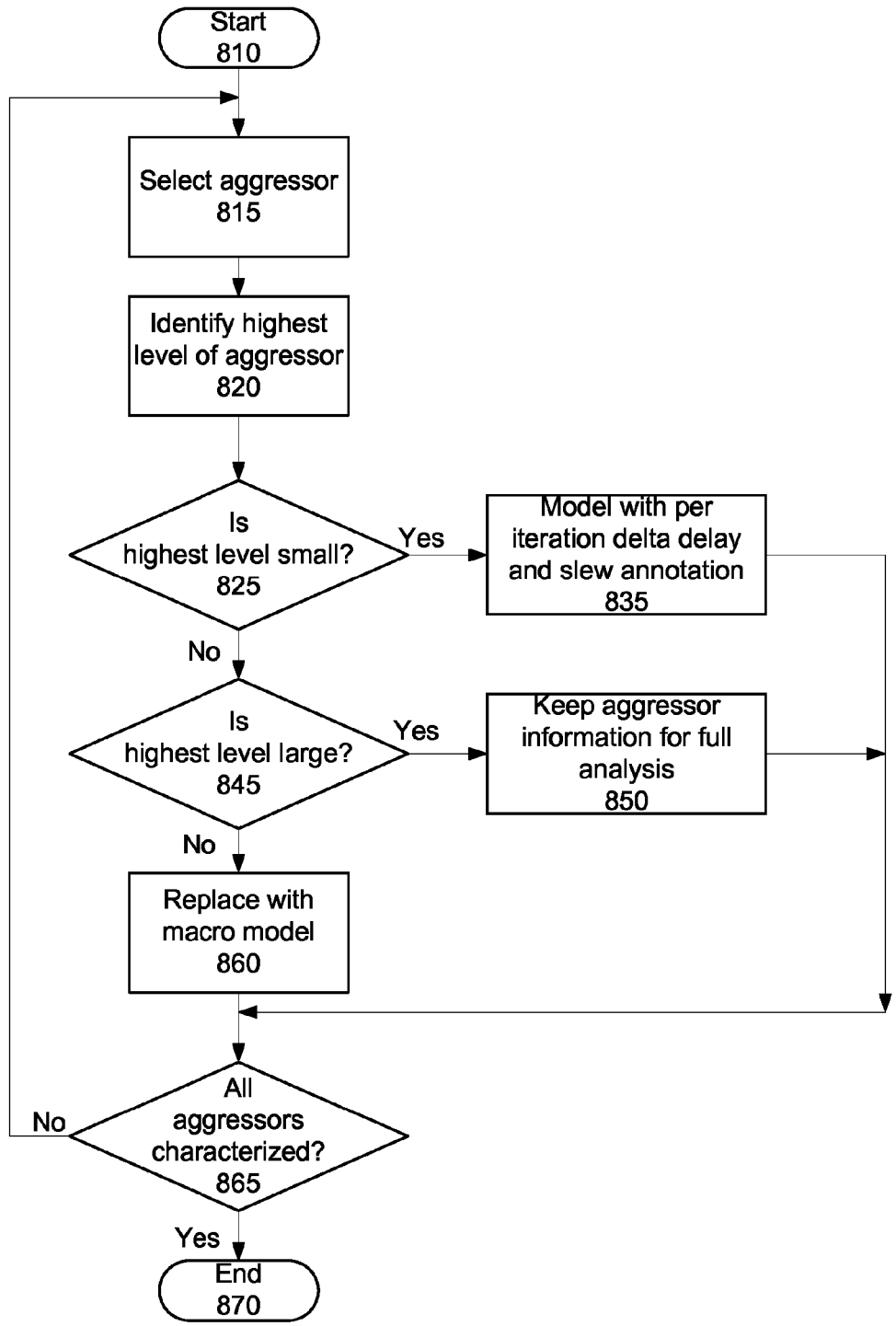
FIG. 8 is a flowchart of one embodiment of handling high and low level aggressors.

FIG. 8 is a flowchart of another embodiment of characterizing the aggressor. In one embodiment, this is done after each victim net is evaluated. The process starts at block 810.

At block 815, an aggressor is selected, and at block 820, the highest level of classification for that aggressor is selected. Since in one embodiment only one set of data is stored for each aggressor, the most complete data required by any one victim net evaluation is used. Therefore, the highest classification is selected.

At block 825, the process determines whether the highest level is a small. If so, the data is modeled for a small aggressor. In one embodiment, small aggressors are replaced by a delta delay and slew annotation. In another embodiment, other replacement may be used. In one embodiment, for small enough aggressors, their effect may be entirely discounted, and they may be removed from the representation of the circuit. The process then continues to block 865. At block 865, the process determines whether all aggressors have been characterized. If not, the process returns to block 815, to select an aggressor. If so, the process ends at block 870.

If, at block 825, the process found that the highest level is not small, the process continues to block 845. At block 845, the process determines whether the highest level is large. If so, at block 850, the aggressor information is kept for full analysis, in one embodiment. The process then continues to block 865 to determine whether all aggressors have been characterized.

If at block 845, the system determined that the highest level is not large, the process continues to block 860. This means that the aggressor is a medium level aggressor and maybe represented with a macro model. The process replaces the aggressor with a Thevenin model, in one embodiment. In one embodiment, the process replaces the medium level aggressor by a macro-model which is a simplified model of the aggressor. In one embodiment, the macro-model may include a Thevenin driver model, lumped parasitic values, and simplified representation of the load (e.g. pin capacitors). In one embodiment, this is applicable to aggressors which have a bump height below a threshold, which have a cumulative bump height under a threshold. In one embodiment, these aggressors have infinite window and thus do not need timing arrival data. In one embodiment, all aggressors are calculated using a macro-model, which means no detailed aggressor parameters are stored.

At the block level, the aggressor nets are marked, and the lumped macro-model aggressor data is saved. This is the data used by the top level evaluation, as described above. A typical stage with medium crosstalk effect has multiple aggressors; a few aggressors have large coupling bumps; many aggressors have small coupling bumps. The majority of the aggressors are analyzed using macro-model engine.

In one embodiment, the system sets the criteria so a certain percentage of aggressors are categorized as small and/or large. In another embodiment, the threshold may be based on the amount of delta delay.

At block 865, the process determines whether all aggressors have been categorized. If not, the process returns to block 815 to select the next aggressor. Otherwise, the process ends at block 870.

Figure 9:
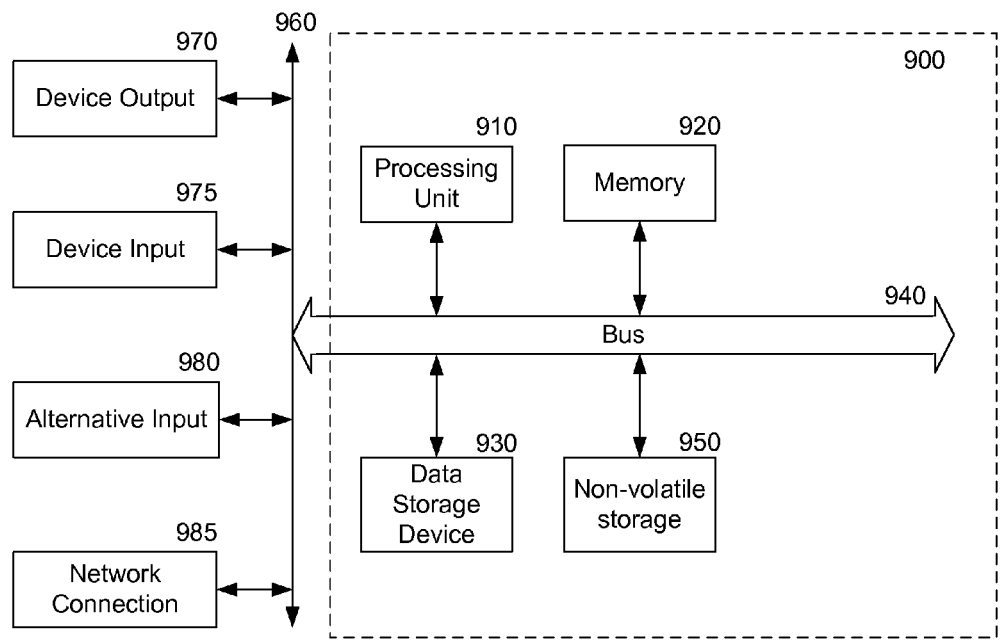
FIG. 9 is a block diagram of one embodiment of a computer system that may be used with the present invention.

FIG. 9 is a block diagram of a particular machine which may be used with the present invention. It will be apparent to those of ordinary skill in the art, however that other alternative systems of various system architectures may also be used.

The data processing system illustrated in FIG. 9 includes a bus or other internal communication means 940 for communicating information, and a processing unit 910 coupled to the bus 940 for processing information. The processing unit 910 may be a central processing unit (CPU), a digital signal processor (DSP), or another type of processing unit 910.

The system further includes, in one embodiment, a random access memory (RAM) or other volatile storage device 920 (referred to as memory), coupled to bus 940 for storing information and instructions to be executed by processor 910. Main memory 920 may also be used for storing temporary variables or other intermediate information during execution of instructions by processing unit 910.

The system also comprises in one embodiment a read only memory (ROM) 950 and/or static storage device 950 coupled to bus 940 for storing static information and instructions for processor 910. In one embodiment the system also includes a data storage device 930 such as a magnetic disk or optical disk and its corresponding disk drive, or Flash memory or other storage which is capable of storing data when no power is supplied to the system. Data storage device 930 in one embodiment is coupled to bus 940 for storing information and instructions.

The system may further be coupled to an output device 970, such as a cathode ray tube (CRT) or a liquid crystal display (LCD) coupled to bus 940 through bus 960 for outputting information. The output device 970 may be a visual output device, an audio output device, and/or tactile output device (e.g. vibrations, etc.)

An input device 975 may be coupled to the bus 960. The input device 975 may be an alphanumeric input device, such as a keyboard including alphanumeric and other keys, for enabling a user to communicate information and command selections to processing unit 910. An additional user input device 980 may further be included. One such user input device 980 is cursor control device 980, such as a mouse, a trackball, stylus, cursor direction keys, or touch screen, may be coupled to bus 940 through bus 960 for communicating direction information and command selections to processing unit 910, and for controlling movement on display device 970.

Another device, which may optionally be coupled to computer system 900, is a network device 985 for accessing other nodes of a distributed system via a network. The communication device 985 may include any of a number of commercially available networking peripheral devices such as those used for coupling to an Ethernet, token ring, Internet, or wide area network, personal area network, wireless network or other method of accessing other devices. The communication device 985 may further be a null-modem connection, or any other mechanism that provides connectivity between the computer system 900 and the outside world.

Note that any or all of the components of this system illustrated in FIG. 9 and associated hardware may be used in various embodiments of the present invention.

It will be appreciated by those of ordinary skill in the art that the particular machine which embodies the present invention may be configured in various ways according to the particular implementation. The control logic or software implementing the present invention can be stored in main memory 920, mass storage device 930, or other storage medium locally or remotely accessible to processor 910.

It will be apparent to those of ordinary skill in the art that the system, method, and process described herein can be implemented as software stored in main memory 920 or read only memory 950 and executed by processor 910. This control logic or software may also be resident on an article of manufacture comprising a computer readable medium having computer readable program code embodied therein and being readable by the mass storage device 930 and for causing the processor 910 to operate in accordance with the methods and teachings herein.

The present invention may also be embodied in a handheld or portable device containing a subset of the computer hardware components described above. For example, the handheld device may be configured to contain only the bus 915, the processor 910, and memory 950 and/or 920.

The handheld device may be configured to include a set of buttons or input signaling components with which a user may select from a set of available options. These could be considered input device #1 975 or input device #2 980. The handheld device may also be configured to include an output device 970 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processing unit 910, a data storage device 930, a bus 940, and memory 920, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 985.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 910. A machine-readable medium includes any mechanism for storing information in a form readable by a machine (e.g. a computer). For example, a non-transitory machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Embodiments of the present invention implement a solution for hierarchical static timing analysis (STA) that provides a high degree of accuracy and consistency in its results while executing STA runtimes much shorter than conventional flat STA runtimes. In one embodiment, the system stores iteration-based specific data for the effects of aggressors on a victim net from a block-level analysis, and then retrieves this data on a per-iteration basis for top-level analysis. This provides a more accurate representation of the circuit, with a lower memory requirement, and faster execution.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed description were presented as procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "analyzing" or "storing" or "performing" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for hierarchical static timing analysis comprising:
performing one or more iterations in static timing analysis on a lower-level block;
storing intermediate data of the static timing analysis of the lower-level block for an iteration, including simplified representations of aggressor effects, the simplification based on an plurality aggressor types; and
loading and utilizing the stored intermediate data in performing static timing analysis on an upper-level block.

2. The method of claim 1, wherein the intermediate data of the lower-level block analysis for the iteration is stored to a data storage device.

3. The method of claim 1, further comprising:
marking and representing aggressors in a circuit;
evaluating a victim net impacted by one or more aggressors;
classifying the one or more aggressors into one of a plurality of aggressor types; and
simplifying the aggressor representation based on the determined aggressor type.

4. A method for hierarchical static timing analysis comprising:
performing one or more iterations in static timing analysis on a lower-level block;
storing intermediate data of the static timing analysis of the lower-level block for an iteration, wherein the intermediate data comprises marking data and a representation of the aggressors in the lower-level block;
loading and utilizing the stored intermediate data in performing static timing analysis on an upper-level block.

5. The method of claim 4, wherein the intermediate data of the lower-level block analysis for the iteration is stored to a data storage device.

6. The method of claim 5, wherein the intermediate data of the lower-level block analysis for the iteration is loaded from the data storage device to perform the static timing analysis on the upper-level block.

7. The method of claim 4, wherein the intermediate data of the lower-level block analysis for the iteration is utilized in the upper-level iteration.

8. A method of marking and modeling aggressors in a circuit, the method comprising:
evaluating a victim net in the circuit impacted by one or more aggressors, including marking and representing aggressors in a circuit;
classifying the one or more aggressors into types; and
simplifying aggressor representation based on the determined type, wherein the simplified aggressor representation is derived from an iteration of a block level static timing analysis on a lower level block.

9. The method of claim 8, wherein the plurality of aggressor types comprise: low level, medium level, and high level aggressors.

10. The method of claim 9, wherein a medium level aggressor of a victim is abstracted by a lumped macro-model.

11. The method of claim 10, wherein the lumped macro-model comprises of a Thevenin driver model and lumped aggressor net resistance, ground and coupling capacitance values.

12. The method of claim 9, wherein a high level aggressor of a victim is abstracted by a reduced complexity model.

13. The method of claim 12, wherein, drivers of the aggressor is reduced to represent only the worst case switching scenario.

14. The method of claim 12, wherein, receivers of the aggressor are reduced to pin capacitors.

15. The method of claim 9, wherein a low level aggressor of a victim is abstracted by a delta delay and slew.

16. The method of claim 8, further comprising:
storing the simplified aggressor representation; and
using the simplified aggressor representation in an iteration of the static timing analysis in an upper level upper-level block.

17. A system to enable hierarchical static timing analysis, comprising a computer system including a processor, memory and hard disk, the system comprising:
the processor to perform iterative static timing analysis on a lower-level block;
a data storage device to store intermediate data of the static timing analysis of the lower-level block for each iteration, including simplified representations of aggressor effects, the simplification based on an plurality aggressor types;
a volatile memory to store a retrieved intermediate data from the analysis of the lower-level block on a per iteration basis; and
the processor to utilize the intermediate data of the iteration in the volatile memory to perform static timing analysis on an upper-level block.

18. The system of claim 17, wherein the intermediate data a simplified representation of aggressors, the simplification based on a plurality aggressor types.

19. An article of manufacture comprising a machine-accessible non-transitory medium including data that, when accessed by a machine, cause the machine to perform operations comprising:
performing one or more iterations in static timing analysis on a lower-level block, the lower level block;
storing intermediate data of the static timing analysis of the lower-level block for an iteration, including simplified representations of aggressor effects, the simplification based on an plurality aggressor types; and
loading and utilizing the stored intermediate data in performing static timing analysis on an upper-level block.

20. The article of manufacture of claim 19, wherein the simplified representations of aggressor effects are generated by:
marking and representing aggressors in a circuit;
evaluating a victim net impacted by one or more aggressors;
classifying the one or more aggressors into one of a plurality of aggressor types;
simplifying the aggressor representation based on the determined aggressor type.

21. The article of manufacture of claim 20, wherein the data causing the machine to perform mark one or more aggressors comprises data that, when accessed by the machine, cause the machine to perform operations comprising:
evaluating a victim net impacted by one or more aggressors;
classifying the one or more aggressors into types;
simplifying aggressor representation based on the determined type.

* * * * *